United States Patent
Mattson

Patent Number: 6,039,259
Date of Patent: Mar. 21, 2000

[54] MAGNETIC CARD READ/WRITE APPARATUS

[75] Inventor: Per Gustav Mattson, Sundbyberg, Sweden

[73] Assignee: U.S. Philips Corporation, New York, N.Y.

[21] Appl. No.: 08/999,721

[22] Filed: Sep. 20, 1991

Related U.S. Application Data

[63] Continuation of application No. 07/292,693, Jan. 3, 1989, abandoned.

[30] Foreign Application Priority Data

Jan. 5, 1988 [SE] Sweden ................................. 8800011

[51] Int. Cl.[7] .................................................. G06K 13/00
[52] U.S. Cl. ............................................................. 235/475
[58] Field of Search ................................... 235/449, 475, 235/476, 477, 479, 480, 482; 360/2

[56] References Cited

U.S. PATENT DOCUMENTS

| | | | |
|---|---|---|---|
| 1,933,714 | 11/1933 | Cunningham | 235/421 |
| 3,548,196 | 12/1970 | Minasian | 250/224 |
| 3,716,698 | 2/1973 | Simjian | 235/485 |
| 3,731,061 | 5/1973 | Laybourn | 235/480 |
| 3,831,188 | 8/1974 | Zupancic et al. | 235/475 |
| 3,929,278 | 12/1975 | Balavoine et al. | 235/479 |
| 3,939,327 | 2/1976 | Humphrey | 235/485 |
| 3,976,858 | 8/1976 | Haun | 235/482 |
| 4,025,956 | 5/1977 | Nozaki et al. | 360/2 |
| 4,040,097 | 8/1977 | Mizuno | 360/2 |
| 4,081,131 | 3/1978 | Sand et al. | 235/449 |
| 4,180,823 | 12/1979 | Guyot et al. | 346/139 B |
| 4,332,492 | 6/1982 | Thern et al. | 400/322 |
| 4,438,328 | 3/1984 | Kuranishi et al. | 235/482 |
| 4,529,872 | 7/1985 | Dinges | 235/482 |
| 4,598,810 | 7/1986 | Shore et al. | 902/22 |
| 4,670,643 | 6/1987 | Hain et al. | 235/375 |

FOREIGN PATENT DOCUMENTS

| | | |
|---|---|---|
| 0232115 | 8/1987 | European Pat. Off. |
| 2058099 | 6/1972 | Germany |
| 2705534 | 6/1978 | Germany |
| 60-154357 | 8/1985 | Japan |

*Primary Examiner*—Michael G Lee
*Assistant Examiner*—Daniel H. Sherr
*Attorney, Agent, or Firm*—Edward W. Goodman

[57] ABSTRACT

Card reader in which the card is read in a direction parallel to the input direction (9) after the card by means of a first movement has been fed a first distance essentially equal to or longer than the carrier length in the input direction. The reading takes place during simultaneous movement of the card (1) and a head (2) in opposite directions (9, 8). A transmission element (6) fixedly mounted to the device is arranged, in dependence of a second continued movement of the carrier (1) a second distance which is shorter than the carrier length, to take care of an opposite movement of the read head (2) by a movement which is shorter or equal to the second distance.

11 Claims, 2 Drawing Sheets

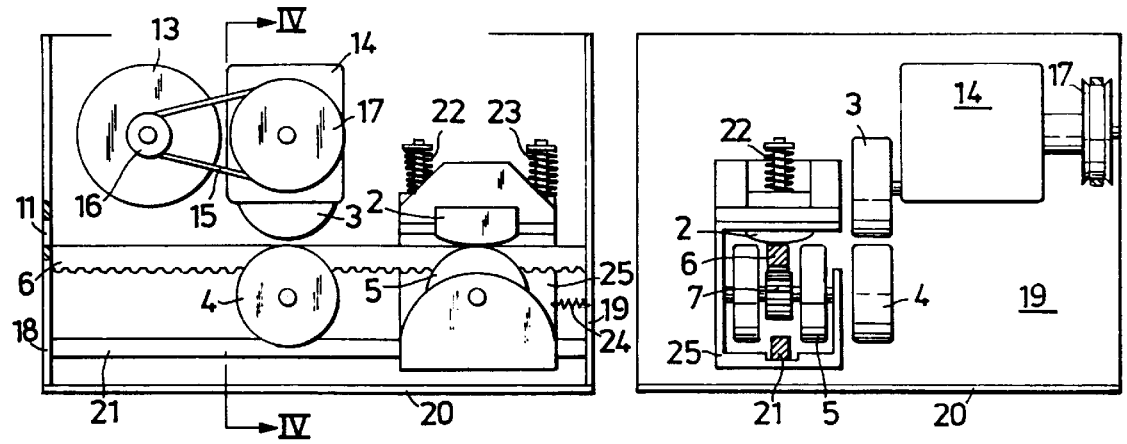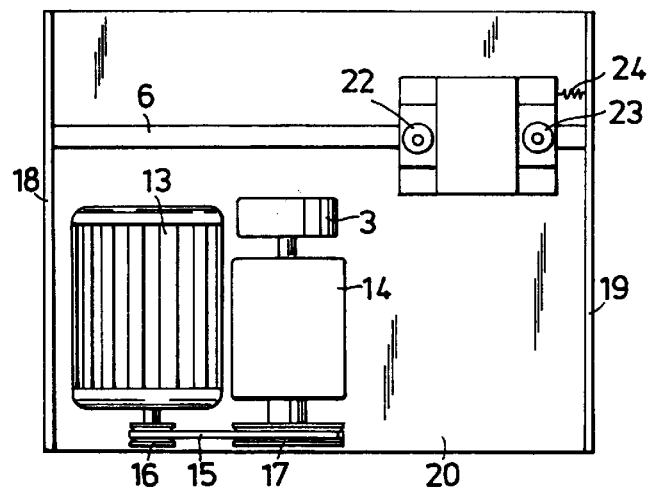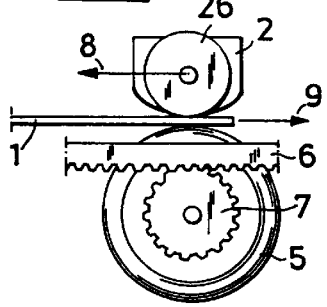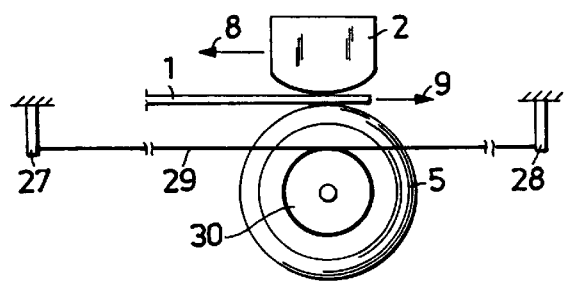

MAGNETIC CARD READ/WRITE APPARATUS

This is a continuation of application Ser. No. 07/292,693, filed Jan. 3, 1989, now abandoned.

BACKGROUND OF THE INVENTION

The invention relates to a record and/or read device for a record carrier of card type, in which drive means moves the record carrier and a record and/or read head scans the record carrier during relative movement between the carrier and the head. In a first movement the carrier is fed into the device a first distance substantially equal to or longer than the carrier length in the input direction.

A record and read device according to the above which is available in the market, presents troublesome dimensions, particular in a direction parallel to the direction of movement of the record carrier. In this direction the total length of the device has to amount to at least three times the length of the carrier.

In order that the operator shall not be able to manipulate the record carrier during the recording and/or reading process, the total record carrier has to be fed in before the recording and/or reading is started. A relatively long record carrier is required for this purpose. During the subsequent feeding in of the record carrier the recording and/or reading of the record carrier takes place by means of a movement relative to the record and/or read device non-moveable head. One further record carrier length is used for this recording and/or reading. If, when the record carrier has been read, it is found that the record carrier ought to be confiscated, the record carrier has to be fed in a further record carrier length. Accordingly, a device as described above having a non-moveable head and an input direction parallel to the reading direction requires a total length of at least three record carrier lengths.

SUMMARY OF THE INVENTION

A transmission element is fixed to the device, and arranged in dependence of a second continued movement of the carrier a second distance which is shorter than the length of the carrier to provide of an opposite movement of the record and/or read head by means of a movement which is shorter than or equal to the second distance. The device according to the invention only requires one and a half record carrier length, that is only half the length in comparison with the available device. This will be apparent from the description below with reference to the drawings.

An other read device is previously known from SE published print 6917693-8. The record carrier is in this case introduced in a direction which is perpendicular to the direction of movement of the read head. The reading is carried out in that the read head is moved across a record carrier which according to the shown embodiments is stationary relative to the read device. By the way it is further in said print pointed out that the relative movement between the read head and the record carrier may be obtained in another way, for example, by means of a simultaneous displacement of both the read head and the record carrier. Such an embodiment is neither shown or indicated. Due to the fact that the record carrier is introduced in a direction which is perpendicular to the direction of movement of the read head, the prior art device occupies an essentially greater space in a surface region facing the operator in comparison with the device according to the invention. This renders the device difficult to locate in comparison with the device according to the invention.

The linear movement of the record carrier may be in a direction which essentially corresponds to an equally long linear movement in distance of the head in an opposite direction. This embodiment involves a minimizing of the length dimension of the device in the case when the whole record carrier is scanned on the same side of the drive roller and pressure roller of the drive means, which is often preferable. Hereby the device is especially space saving in the length direction.

A number roller of auxiliary may be connected to the record and/or read head, the auxiliary roller running along the record carrier together with the head in order to substantially eliminate sliding friction between the head and the record carrier. The auxiliary rollers protects the record and/or read head against wear and facilitates the movement of the record carrier between the head and the friction means.

The fixedly mounted transmission element may consist of a gear rack in engagement with a gear wheel arranged on a rotatable coupling means, the coupling means being coupled to the record carrier when the carrier is brought past the head. The gear coupling is a simple and reliable coupling between a fixed part in the device and the coupling means.

By means of the device according to the invention a very simple synchronizing of the carrier and head is obtained. The carrier operates as a link between the drive means and the head and the feeding in in front of the head releases directly an simultaneous mutually opposite motion of the head and carrier. No synchronizing problems occur and there are no need for sensors sensing that the carrier has been fed into position in front of the head.

BRIEF DESCRIPTION OF THE DRAWINGS

FIG. 2 is a schematic side view of the read device;

FIG. 3 is a schematic plan view of the read device;

FIG. 4 is a schematic end section taken along the line IV—IV in FIG. 2;

FIG. 5 is an enlarged schematic side view of the coupling means;

FIG. 6 is an enlarged schematic side view of an alternative coupling means.

DETAILED DESCRIPTION OF THE PREFERRED EMBODIMENTS

Figure 1A:
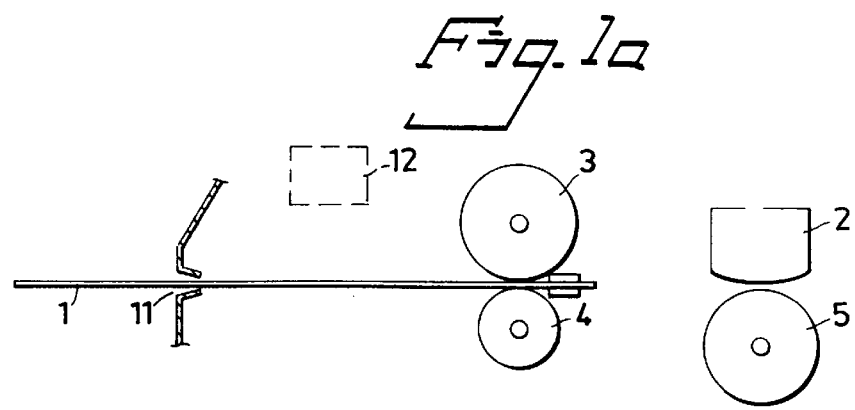
FIGS. 1a–1d are schematic side views showing the card feed.
Figure 1B:
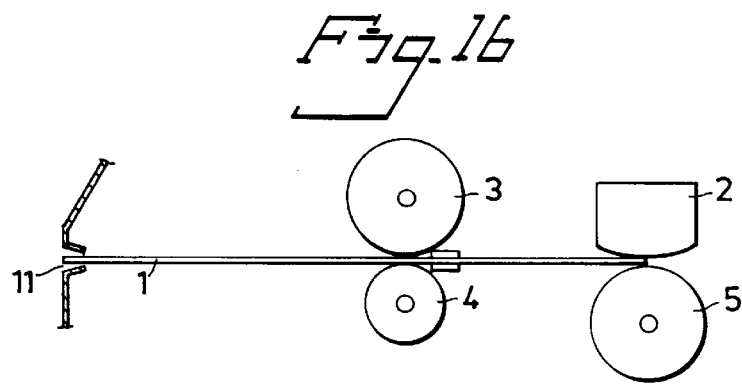
Figure 1C:
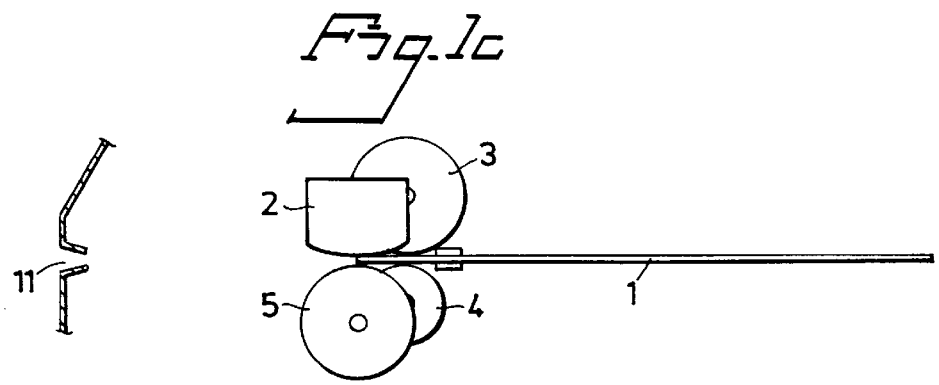
Figure 1D:
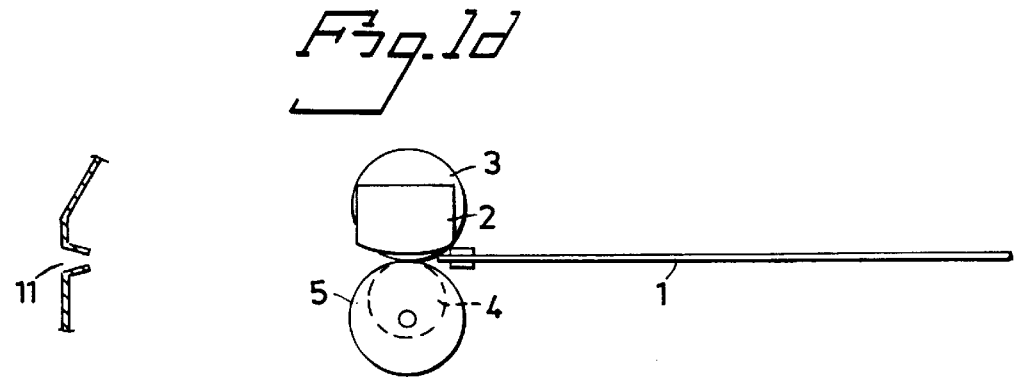

The record and/or read device schematically shown in FIG. 1a–1d, which is intended for a record carrier of card type, for example a bank card, comprises a drive roller 3 and a pressure roller 4 located half a record carrier length from the input opening 11 of the device. The device comprises further a friction roller 5 and a record and/or read head 2 located on a displaceable carrage (not shown in FIG. 1). The friction roller 5 and the head 2 are arranged to be displaceable at least slightly more than half the record carrier length.

When the record carrier 1 is fed into the input opening 11 at first normally a control takes place to ensure that a record carrier really is fed in and that it is turned right way around relative to the record and/or read device before a continued feeding in is allowed. This control equipment is not shown in the figure and is not either a part of the invention applied for a patent. If the control equipment allows a continued feeding in of the record carrier, the operator may push in the record carrier so far that the inner end of the record carrier is grasped by the drive and pressure rolls 3 and 4, respectively. The drive roller 3 and the pressure roller 4 will now take over the further feeding in of the record carrier. FIG. 1*a* shows the stage when the drive roller and the pressure roll take over the feeding in. From the stage shown in FIG. 1*a* to the stage shown in FIG. 1*b* the remaining part of the record carrier is fed in. When the whole record carrier has been fed in, the recording and/or reading may start. The drive and pressure rollers 3, 4, respectively, will now bring the record carrier I between the head 2 and the friction roller 5. The recording and/or reading takes place between the stage shown in FIG. 1*b* and the stage shown in FIG. 1*c* and by means of a further feeding in of the record carrier by the drive and the pressure rollers 3, 4 at the same time as the head 2 and the friction roller 5 are moved towards the input opening. The movement of the head and the friction roller is obtained by means of a friction coupling between the roller friction and the record carrier by means of the head at the same time as the friction roller is rotatable coupled to a fixedly arranged transmission element. The coupling of the friction roller will be described in more detail in connection with the description of the FIGS. 2–5.

A verifying means 12 verifies the validity of a record carrier which has been fed in. The verifying means is only shown as a box drawn by means of dashed lines in FIG. 1*a*. In the case that the record carrier which has been fed in is regarded as valid by the verifying means, a feeding out of the record carrier by means of a reversal of the drive roller 3 and thereby the pressure roller 4 is allowed when the recording and/or reading have been finnished. If on the other hand the record carrier is regarded as non-valid, it is confiscated by the device. This is obtained by feeding in the record carrier somewhat further to the stage shown in FIG. 1*d* by means of the drive roller and the pressure roller. In the last mentioned stage the record carrier is released from the coupling between the friction roller and the head and may fall down under the influence of the gravitational force.

As is apparent from FIG. 1 the device then requires a total length of approximately one and a half record carrier length, namely slight more than a half record carrier length between the input opening and the drive roller and one complete record carrier length between the drive roller and the inner end of the device.

With reference to the FIGS. 2–5 the driving of the record carrier and the head will now be described in more detail. Components with correspondance in FIG. 1 have been given the same reference numerals.

The drive roll 3 is driven by a drive motor 13. In order to obtain a suitable gear change the drive roller is coupled via a gear box 14. The transmission between the drive motor 13 and the gear box 14 is obtained by means of a driving belt 15 which transmits the rotation of a pulley 16 arranged on a motor shaft to a pulley 17 mounted on an input shaft of the gear box 14. The device comprises a front and a back supporting section 18 and 19, respectively, mounted on a bottom plate 20. A fixedly mounted element in the shape of a gear rack 6 is arranged between the supporting sections 18, 19 as well as a guide rail 21. A carrage 25 provided with a friction roller 5 and a record and/or read head 2 cooperate with the gear rack 6 and the guide rail 21 to control the movement along the gear rack 6. As is most apparent from the FIGS. 4 and 5 a gear wheel 7 arranged on the friction roller is in engagement with the gear rack 6.

The head 2 is resiliently supported by means of two springs 22, 23 in order to protect the same. A weak spring load, symbolically indicated by means of the spring 24, with a weak force tends to bring the carrage 25 to the position shown in FIG. 1*a* in the case when no record carrier is present between the head and the friction roller. When a record carrier by means of the drive and pressure rollers are fed in between the head and the friction roller, the gear wheel 7 arranged on the friction roller is rotated along the fixed part in the device, which in this case consists of the gear rack 6. During the continued feeding in of the record carrier the head 2 is moved in a direction 8 (see FIG. 5) and the record carrier 1 in an opposite direction 9 (see FIG. 5).

The coupling between the friction roller and the fixedly mounted transmission element consists according to the above of a gear coupling, but of course other couplings are conceivable within the scope of the invention. For example, the friction roller, as according to the embodiment shown in FIG. 6, may be coupled to two fixed fastening points 27, 28 via a wire 29. In this case the friction roller 5 is provided with a shaft 30 around which the wire has been wound a number of revolutions and stretched. A suitable ratio of the radius of the shaft and the friction roll is 1:2. Elements in FIG. 6 which have correspondence in the FIG. 1–5 have also been given the same reference numerals.

In order to facilitate the movement of the record carrier past the head, the head as shown in FIG. 5 may be provided with a number of auxiliary rollers 26. According to an appropriate solution an auxiliary roller 26 is located on each side of the head. It is even conceivable to divide the head into several parts and between these introduce further auxiliary rollers.

What is claimed is:

1. A recording/reading device for record carriers of the card type, comprising:

drive means for moving the record carrier into the recording/reading device over a first distance substantially equal to or longer than a length of said carrier in an input direction; and a record/read head for scanning the record carrier during relative movement between the record carrier and the record/read head, characterized in that the drive means further moves the record carrier the carrier in the input direction over a second distance which is a continuation of the first distance, said second distance being shorter than the length of the record carrier, and said recording/reading device further comprises:

further drive means for moving the record/read head over a distance shorter than or equal to the second distance in a direction opposite to the input direction, said further drive means being driven by the record carrier as a result of frictional contact between the record carrier, being moved by the drive means, and the further drive means.

2. The recording/reading device as claimed in claim 1, characterized in that the distance over which the record/read head moves in a direction opposite to the input direction is substantially equal to said second distance.

3. The recording/reading device as claimed in claim 1, characterized in that a number of auxiliary rollers are disposed in proximity to the record/read head, the auxiliary rollers being rotated by the record carrier and move together with the record/read head in order to decrease sliding friction between the record/read head and the record carrier.

4. The recording/reading device as claimed in claim 1, characterized in that the drive means comprises a drive roller and a pressure roller for contact with the record carrier.

5. The recording/reading device as claimed in claim 1, characterized in that the further drive means comprises a fixedly mounted transmission element coupled to a rotatable roller.

6. The recording/reading device as claimed in claim 5, wherein the fixedly mounted transmission element comprises a gear wheel coupled to said rotatable roller, and a gear rack in gear engagement with said gear wheel.

7. The recording/reading device as claimed in claim 5, wherein the fixedly mounted transmission element comprises a wire and fastening points of said wire, said wire being wound around a shaft of said rotatable roller.

8. The recording/reading device as claimed in claim 1 characterized in that the recording/reading device further comprises a verifying device for verifying a validity of the record carrier, said verifying device controlling the drive means and the further drive means such that, after recording and/or reading, the drive means and further drive means reverse the direction of movement of the record carrier and the record/read head, respectively, when the verifying device determines that a record carrier is valid, and such that the drive means continues moving the record carrier into the recording/reading device in the input direction for confiscation when the verifying device determines the record carrier is not valid.

9. The recording/reading device as claimed in claim 1, characterized in that said recording/reading device further comprises loading means for exerting an influence on the record/read head in order to bring said record/read head to an end position when the record/read head is not being driven by the further drive means, whereby when said record/read head is in said end position, the record/reading device is prepared to again receive a record carrier.

10. The recording/reading device as claimed in claim 9, characterized in that the loading means is a spring.

11. The recording/reading device as claimed in claim 5, characterized in that the record/read head and the rotatable roller are arranged on a common and moveable carriage.

* * * * *